US010805813B2

United States Patent
Takahashi et al.

(10) Patent No.: US 10,805,813 B2
(45) Date of Patent: Oct. 13, 2020

(54) WIRELESS COMMUNICATION DEVICE THAT PERFORMS COMMUNICATION BASED ON OBTAINED REGULATION INFORMATION THAT DEPENDS ON GEOGRAPHIC LOCATION, AND CONTROL METHOD THEREOF

(71) Applicant: CANON KABUSHIKI KAISHA, Tokyo (JP)

(72) Inventors: Seiji Takahashi, Kawasaki (JP); Shunji Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 15/621,094

(22) Filed: Jun. 13, 2017

(65) Prior Publication Data

US 2017/0374567 A1    Dec. 28, 2017

(30) Foreign Application Priority Data

Jun. 24, 2016   (JP) .................................. 2016-125914

(51) Int. Cl.
| | | |
|---|---|---|
| *H04W 24/04* | (2009.01) | |
| *H04W 48/16* | (2009.01) | |
| *H04W 24/08* | (2009.01) | |
| H04W 84/12 | (2009.01) | |
| H04W 88/08 | (2009.01) | |

(Continued)

(52) U.S. Cl.
CPC ........... *H04W 24/04* (2013.01); *H04W 24/08* (2013.01); *H04W 48/16* (2013.01); *H04W 24/02* (2013.01); *H04W 48/02* (2013.01); *H04W 84/12* (2013.01); *H04W 88/08* (2013.01)

(58) Field of Classification Search
CPC ..... H04W 24/04; H04W 24/08; H04W 24/02; H04W 48/02
USPC .......................................... 370/328
See application file for complete search history.

(56) References Cited

U.S. PATENT DOCUMENTS

| | | | |
|---|---|---|---|
| 2,014,020 A | * | 9/1935 | Hano ........................ B41L 5/00 462/7 |
| 6,157,465 A | | 12/2000 | Suda et al. |
| 6,477,570 B1 | | 11/2002 | Takayama et al. |

(Continued)

FOREIGN PATENT DOCUMENTS

| | | |
|---|---|---|
| CN | 102833876 A | 12/2012 |
| JP | 2009533905 A | 9/2009 |

(Continued)

OTHER PUBLICATIONS

Chinese Office Action dated Jun. 3, 2020 in corresponding Chinese Application No. 201710487849.X.

Primary Examiner — Peter P Chau
(74) Attorney, Agent, or Firm — Venable LLP

(57) ABSTRACT

A wireless communication device that is capable of radio communication that complies with a radio regulation of the current location, even without having a function for communicating with a wireless wide area network, and a control method thereof are provided. Regulation information that depends on a geographical location at which radio communication that uses a second communication unit is obtained from an external apparatus using a first communication unit, the second communication unit is controlled so as to adapt to the regulation information, and communication that uses the second communication unit is performed.

21 Claims, 13 Drawing Sheets

(51) Int. Cl.
*H04W 24/02* (2009.01)
*H04W 48/02* (2009.01)

(56) References Cited

U.S. PATENT DOCUMENTS

| | | | |
|---|---|---|---|
| 9,088,760 | B2 | 7/2015 | Fujita |
| 2004/0203824 | A1* | 10/2004 | Mock .................... H04W 48/14 |
| | | | 455/452.1 |
| 2012/0126953 | A1* | 5/2012 | Mori ................... H04L 63/0492 |
| | | | 340/10.5 |
| 2014/0187163 | A1 | 7/2014 | Fujita |
| 2014/0201380 | A1 | 7/2014 | Iko |
| 2014/0365199 | A1* | 12/2014 | Mosterman ......... G06F 17/5009 |
| | | | 703/20 |
| 2015/0099512 | A1 | 4/2015 | Amano |
| 2015/0373635 | A1* | 12/2015 | Wang ...................... H04W 4/02 |
| | | | 455/434 |
| 2017/0048705 | A1 | 2/2017 | Fujita |

FOREIGN PATENT DOCUMENTS

| | | |
|---|---|---|
| JP | 2010226270 A | 10/2010 |
| JP | 2014131108 A | 7/2014 |
| JP | 2014131223 A | 7/2014 |
| JP | 2015073250 A | 4/2015 |
| WO | 2007118207 A1 | 10/2007 |
| WO | 2010/109981 A1 | 9/2010 |

\* cited by examiner

FIG. 4

| FREQUENCY CHANNEL | | | REGION | | | |
|---|---|---|---|---|---|---|
| | | | COUNTRY A | COUNTRY B | COUNTRY C | COUNTRY D |
| 2.4GHz BAND | | 1 | 2412 | ○ | ○ | ○ | ○ |
| | | 2 | 2417 | ○ | ○ | ○ | ○ |
| | | 3 | 2422 | ○ | ○ | ○ | ○ |
| | | 4 | 2427 | ○ | ○ | ○ | ○ |
| | | 5 | 2432 | ○ | ○ | ○ | ○ |
| | | 6 | 2437 | ○ | ○ | ○ | ○ |
| | | 7 | 2442 | ○ | ○ | ○ | ○ |
| | | 8 | 2447 | ○ | ○ | ○ | ○ |
| | | 9 | 2452 | ○ | ○ | ○ | ○ |
| | | 10 | 2457 | ○ | ○ | ○ | ○ |
| | | 11 | 2462 | ○ | ○ | ○ | ○ |
| | | 12 | 2467 | ○ | - | ○ | ○ |
| | | 13 | 2472 | ○ | - | ○ | ○ |
| 5GHz BAND | W52 | 36 | 5180 | ○ | - | ○ | - |
| | | 40 | 5200 | ○ | - | ○ | - |
| | | 44 | 5220 | ○ | - | ○ | - |
| | | 48 | 5240 | ○ | - | ○ | - |
| | W53 | 52 | 5260 | ○ | ○ | ○ | - |
| | | 56 | 5280 | ○ | ○ | ○ | - |
| | | 60 | 5300 | ○ | ○ | ○ | - |
| | | 64 | 5320 | ○ | ○ | ○ | - |
| | W56 | 100 | 5500 | ○ | - | - | - |
| | | 104 | 5520 | ○ | - | - | - |
| | | 108 | 5540 | ○ | - | - | - |
| | | 112 | 5560 | ○ | - | - | - |
| | | 116 | 5580 | ○ | - | - | - |
| | | 120 | 5600 | ○ | - | - | - |
| | | 124 | 5620 | ○ | - | - | - |
| | | 128 | 5640 | ○ | - | - | - |
| | | 132 | 5660 | ○ | - | - | - |
| | | 136 | 5680 | ○ | - | - | - |
| | | 140 | 5700 | ○ | - | - | - |
| | W58 | 149 | 5745 | - | ○ | - | ○ |
| | | 153 | 5765 | - | ○ | - | ○ |
| | | 157 | 5785 | - | ○ | - | ○ |
| | | 161 | 5805 | - | ○ | - | ○ |
| | | 165 | 5825 | - | ○ | - | ○ |
| TRANSMISSION POWER | | | | 10mW/MHz | 1000mW | 100mW | 100mW |

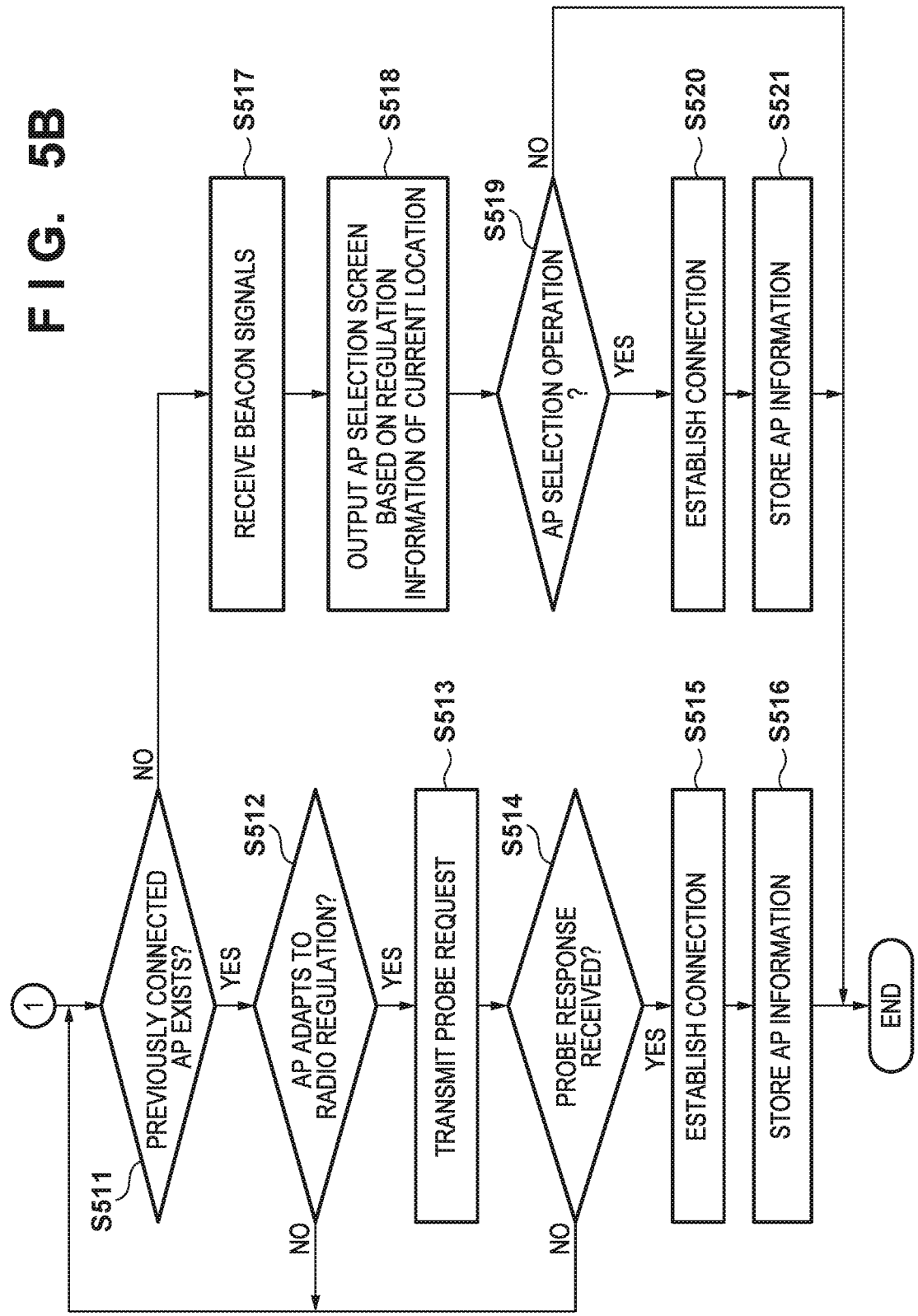

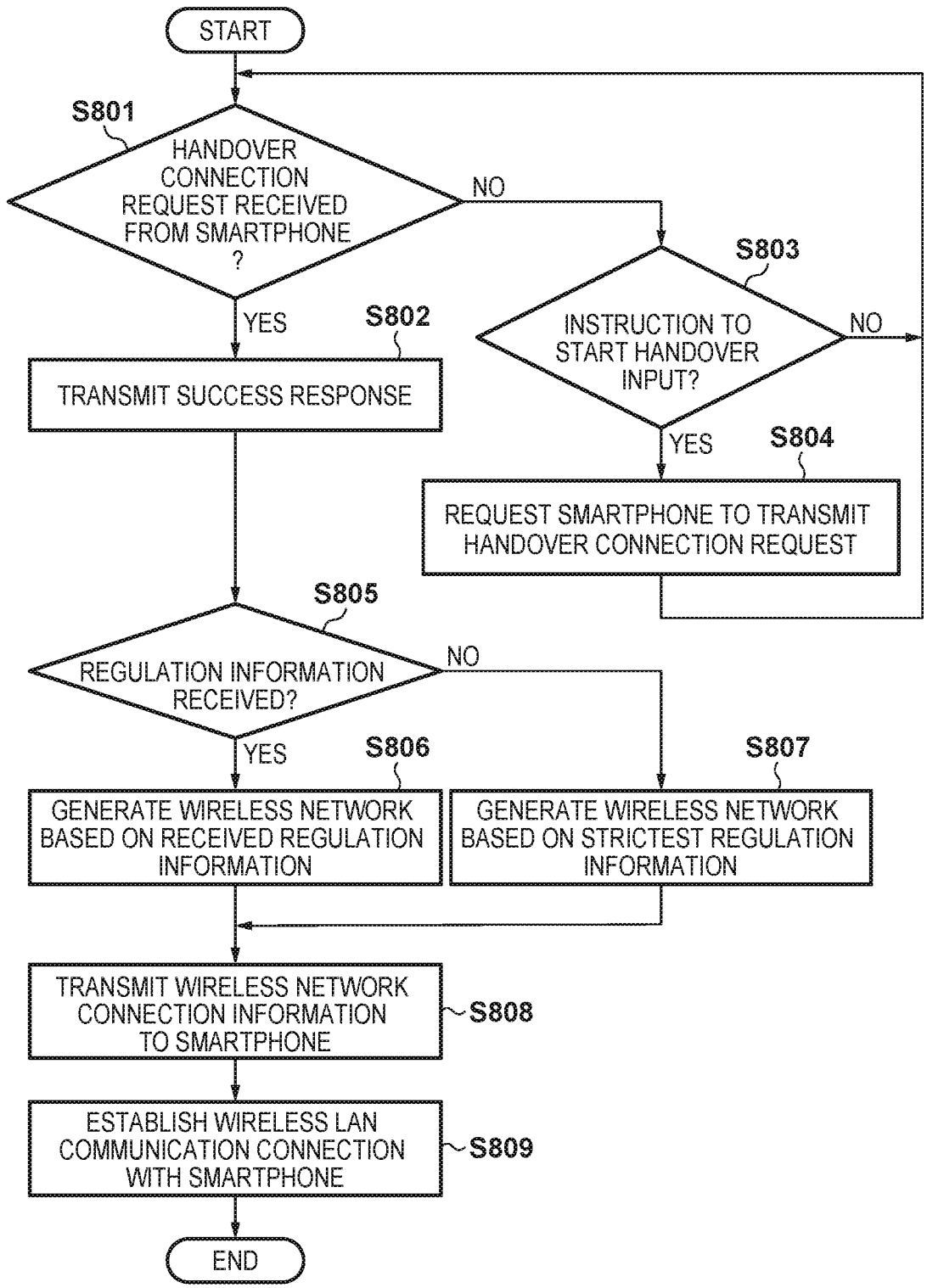

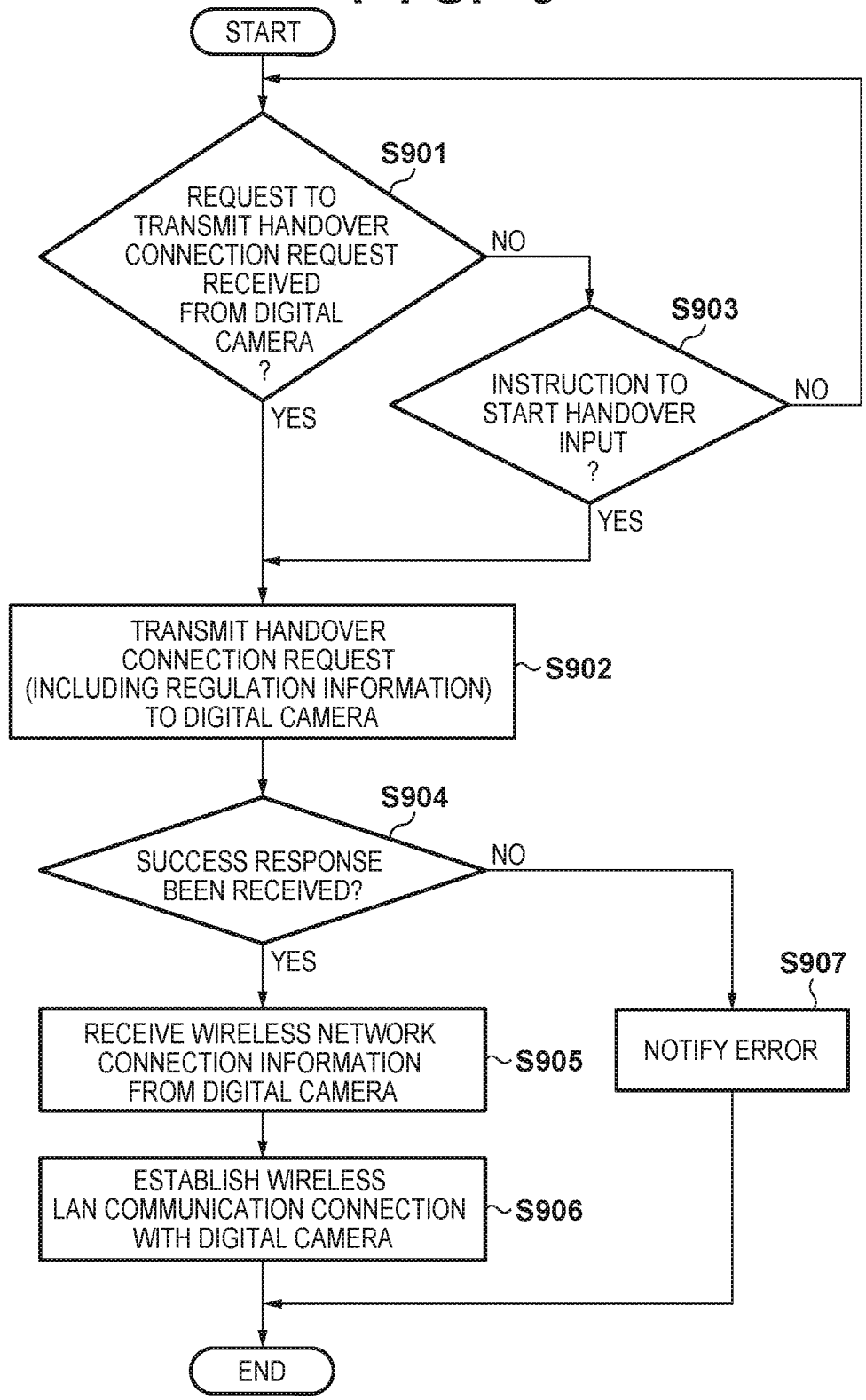

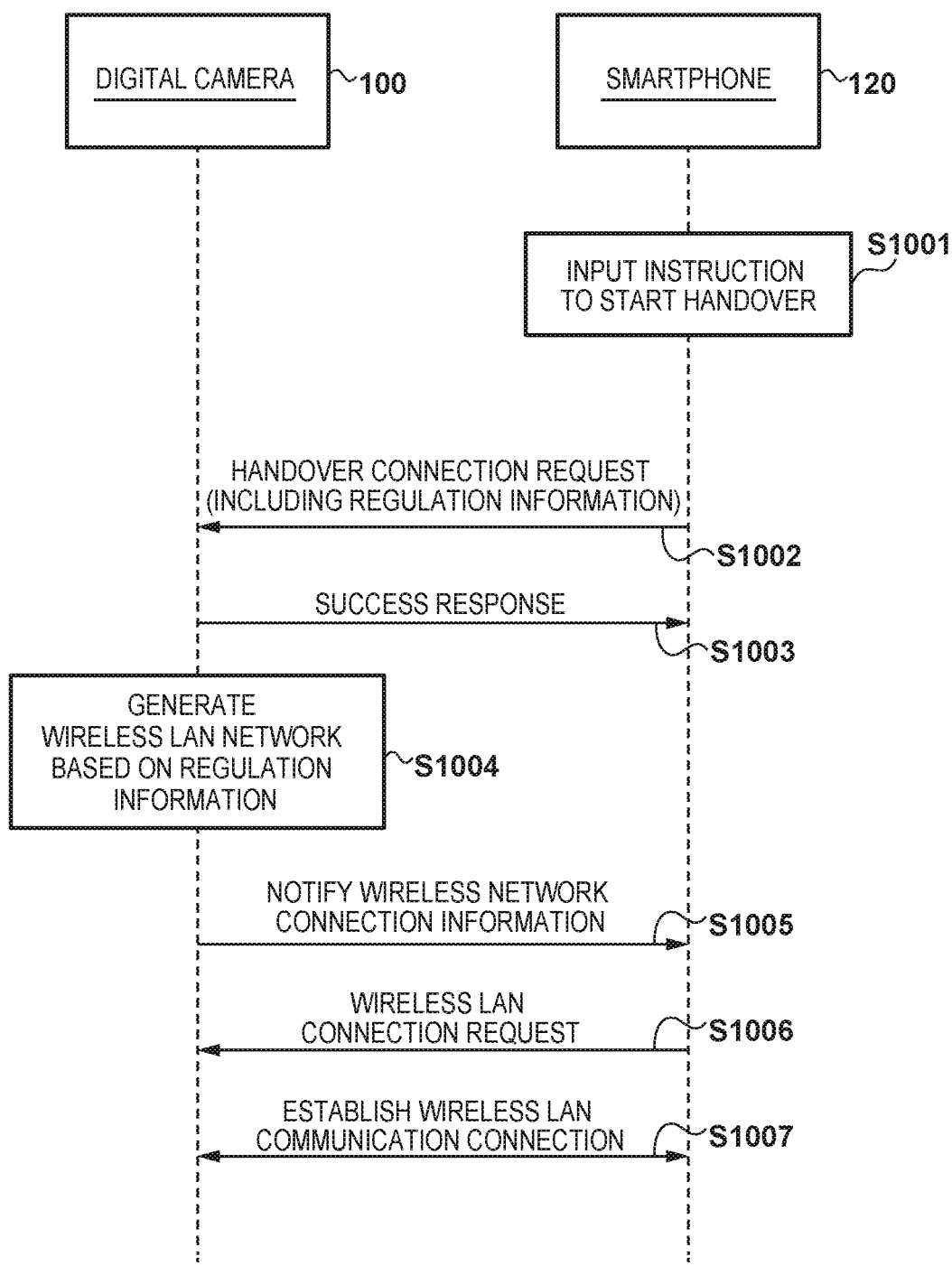

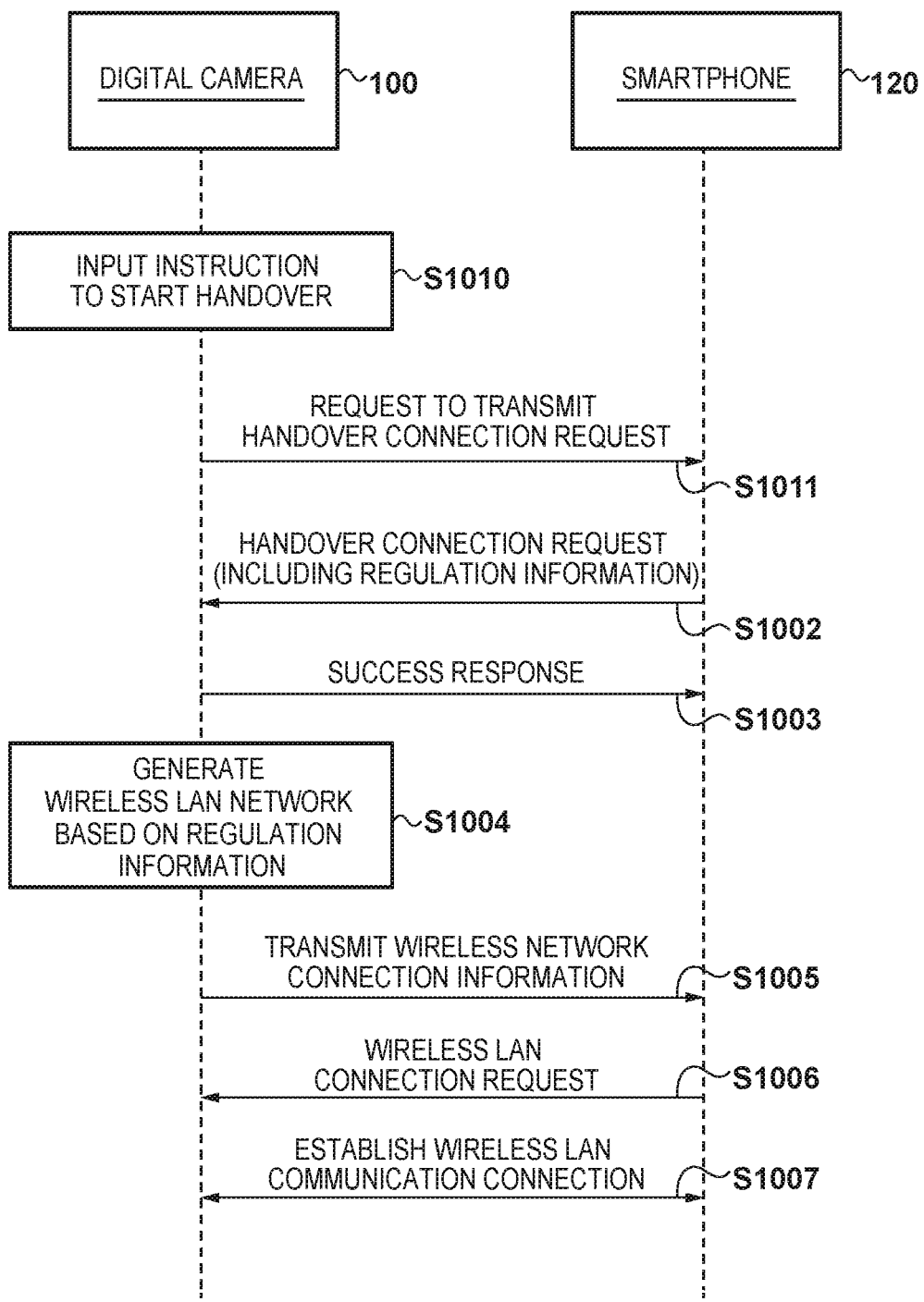

WIRELESS COMMUNICATION DEVICE THAT PERFORMS COMMUNICATION BASED ON OBTAINED REGULATION INFORMATION THAT DEPENDS ON GEOGRAPHIC LOCATION, AND CONTROL METHOD THEREOF

BACKGROUND OF THE INVENTION

Field of the Invention

The present invention relates to a wireless communication device and a control method thereof.

Description of the Related Art

Conventionally, techniques for complying with a radio regulation of a wireless local area network (WLAN) prescribed for each country are known. For example, Japanese Patent Laid-Open No. 2009-533905 discloses a technique for performing network search processing (scan processing) based on country information that is received by a communication terminal from a wireless wide area network (WWAN) such as a cellular network, or input by a user. According to this technique, the communication terminal can perform scan processing that complies with the radio regulation of the current location, from the received country information and radio regulation information (available frequency channels and maximum transmission power) of each country held in advance.

However, in the technique described in Japanese Patent Laid-Open No. 2009-533905, if the communication terminal cannot communicate with WWAN, the user needs to input the country information. Therefore, with an electronic device that does not have a function for communicating with WWAN, the user always needs to input country information, which is troublesome. Also, if the radio regulation information held in the communication terminal is old, it is not possible to carry out scan processing that complies with the latest radio regulation.

SUMMARY OF THE INVENTION

The present invention has been made in light of such issues with conventional techniques. According to the present invention, a wireless communication device and a control method thereof that make it possible to easily realize radio communication that complies with a radio regulation of the current location, even without having a function for communicating with a wireless wide area network, are provided.

According to an aspect of the present invention, there is provided a wireless communication device comprising: a first communication unit; a second communication unit configured to carry out radio communication; and a control unit configured to control operations of the first communication unit and the second communication unit, wherein the control unit: obtains regulation information that depends on a geographical location at which communication using the second communication unit is carried out, from an external apparatus using the first communication unit, and controls the second communication unit so as to adapt to the regulation information and performs communication that uses the second communication unit.

According to another aspect of the present invention, there is provided a wireless communication device comprising: a third communication unit configured to carry out radio communication with a wireless wide area network; a fourth communication unit configured to carry out radio communication with an external apparatus; a fifth communication unit configured to carry out, with the external apparatus, radio communication whose communication range is greater than the radio communication of the fourth communication unit; and a control unit configured to control operations of the third communication unit, the fourth communication unit and the fifth communication unit, wherein the control unit: obtains, using the third communication unit, regulation information that is applied to communication that uses the fifth communication unit at a current location, and transmits the regulation information to the external apparatus through the fourth communication unit.

According to a further aspect of the present invention, there is provided a control method of a wireless communication device that has a first communication unit and a second communication unit, both configured to carry out radio communication, the control method comprising: obtaining regulation information that depends on a geographical location at which communication using the second communication unit is carried out, from an external apparatus using the first communication unit; and controlling the second communication unit so as to adapt to the regulation information and performing communication that uses the second communication unit.

According to another aspect of the present invention, there is provided a control method of a wireless communication device that has a third communication unit configured to carry out radio communication with a wireless wide area network, a fourth communication unit configured to carry out radio communication with an external apparatus, and a fifth communication unit configured to carry out, with the external apparatus, radio communication whose communication range is greater than the radio communication of the fourth communication unit, the control method comprising: obtaining, using the third communication unit, regulation information that is applied to communication that uses the fifth communication unit at a current location; and transmitting the regulation information to the external apparatus through the fourth communication unit.

According to a further aspect of the present invention, there is provided a non-transitory computer-readable storage medium that stores a program executable by a computer of a wireless communication device comprising a first communication unit and a second communication unit configured to carry out radio communication, the program, when executed by the computer, causes the computer to function as: a control unit configured to control operations of the first communication unit and the second communication unit, wherein the control unit: obtains regulation information that depends on a geographical location at which communication using the second communication unit is carried out, from an external apparatus using the first communication unit, and controls the second communication unit so as to adapt to the regulation information and performs communication that uses the second communication unit.

Further features of the present invention will become apparent from the following description of exemplary embodiments with reference to the attached drawings.

BRIEF DESCRIPTION OF THE DRAWINGS

FIG. 4 is a diagram showing an example of radio regulation information used in the embodiments.

FIGS. 5A and 5B are flowcharts related to operations of a digital camera in the first embodiment.

FIG. 8 is a flowchart related to operations of a digital camera in a third embodiment.

FIG. 9 is a flowchart related to operations of a smartphone in the third embodiment.

FIGS. 10A and 10B are sequence diagrams showing an overview of a communication procedure in the third embodiment.

DESCRIPTION OF THE EMBODIMENTS

Exemplary embodiments of the present invention will now be described in detail in accordance with the accompanying drawings. Note that, here, embodiments will be described in which the present invention is applied to a digital camera having a communication function that complies with wireless LAN standards (a wireless LAN communication function). However, the present invention can be applied to any electronic device that has a wireless LAN communication function. Additionally, specific configurations, parameters and the like described in the embodiments are merely specific examples that are provided to assist understanding of the present invention, and are not intended to limit the present invention to the configurations disclosed in the embodiments. All modes included in the description of the claims are included in the present invention. In addition, a plurality of the embodiments can also be combined and implemented.

First Embodiment

Configuration of Communication System

Figure 1:
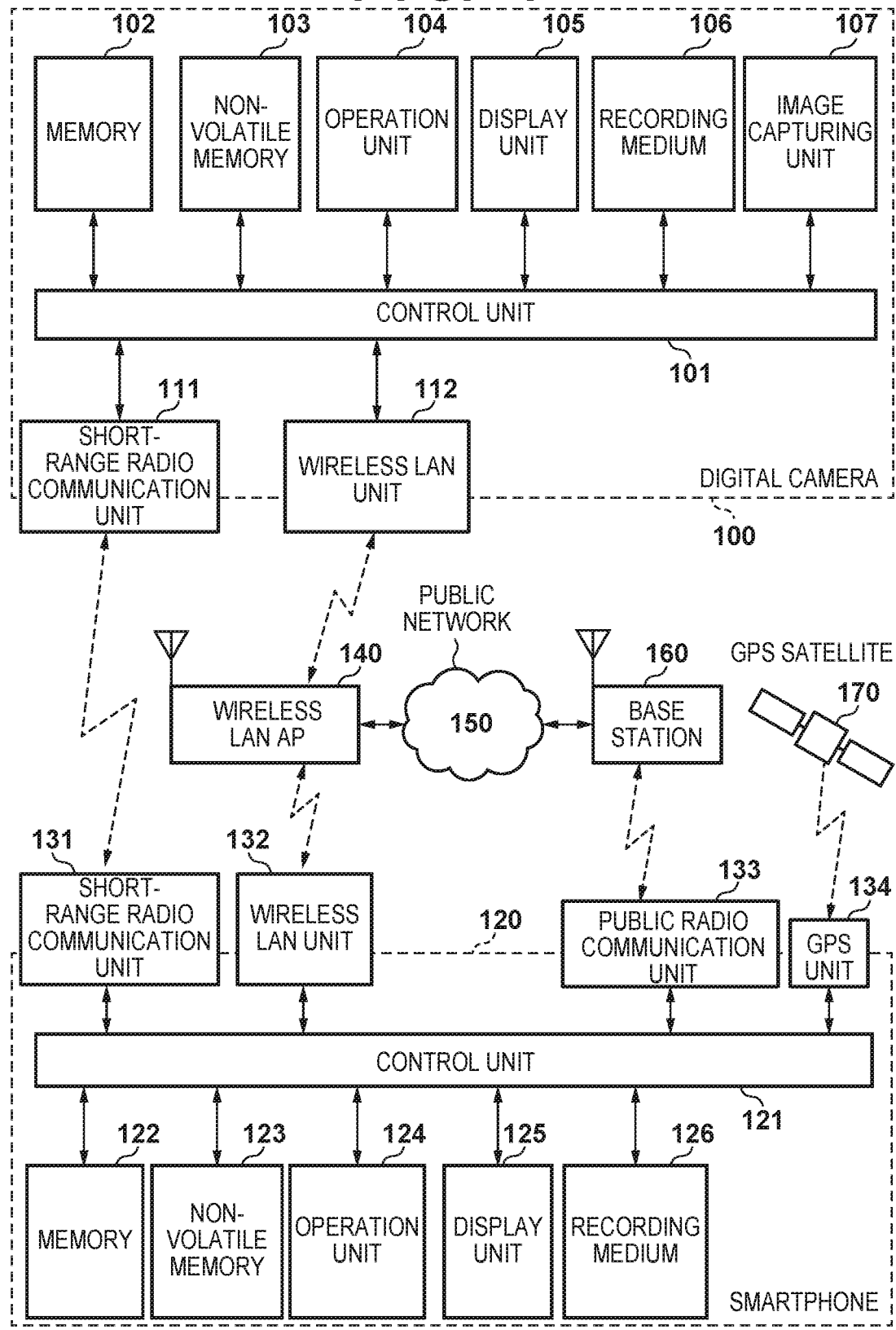
FIG. 1 is a block diagram showing an exemplary functional configuration of a radio communication system according to embodiments of the present invention.

FIG. 1 is a block diagram showing an exemplary configuration of a communication system that includes a digital camera 100 as an example of a communication device according to embodiments of the present invention.

First, the configuration of the digital camera 100 will be described.

For example, a control unit 101 has one or more programmable processors, and controls the constituent elements of the digital camera 100 by loading a program stored in a non-volatile memory 103 to a memory 102 and performing the program, for example, and realizes the functions of the digital camera 100. Note that at least a portion of the operations of the control unit 101 may be processed by hardware such as an ASIC, for example.

The memory 102 is used as a buffer memory for temporarily holding various types of data, and is used as a work area of the control unit 101.

For example, the non-volatile memory 103 is electrically erasable and recordable, and stores programs that are performed by the control unit 101, various setting values, GUI (Graphical User Interface) data and the like.

An operation unit 104 has input devices that can be operated by a user, such as buttons and switches. The operation unit 104 may include a power button, a shutter button, arrow keys, an OK button, a menu button, a screen switching button and the like, but is not limited thereto. The operation unit 104 may also include a touch panel of a display unit 105 and soft keys realized by combination of GUI display and the touch panel.

The display unit 105 is used as an EVF of the digital camera, in GUI display of a menu screen and the like, and in display of a reproduced image. The display unit 105 may be a touch display. Note that it suffices for the digital camera 100 to have at least a display control function, and the display unit 105 may be an external apparatus.

A recording medium 106 is used for storing data of shot images and the like, and may be a non-volatile memory or a magnetic storage apparatus, for example. The recording medium 106 may or may not be detachable. The recording medium 106 may also be an external storage apparatus. It suffices for the digital camera 100 to be capable of accessing at least the recording medium 106.

For example, an image capturing unit 107 has an optical lens unit (including a diaphragm), an image sensor for converting an optical image formed by the optical lens unit into an electrical signal group, and the like. The image capturing unit 107 operates according to control of the control unit 101, and outputs digital data representing a shot image (image data).

A short-range radio communication unit 111 (first communication unit) is constituted by an antenna, a modulation/demodulation circuit and a communication controller, for example. The short-range radio communication unit 111 of this embodiment is assumed to implement short-range radio communication that complies with Bluetooth (registered trademark) 4.0 (also referred to as the Bluetooth Low Energy (BLE)) standard, for example, according to control of the control unit 101. Power consumption with BLE is much lower than with wireless LAN communication that complies with IEEE 802.11x, but the communication distance (communication range) of BLE is shorter, and the communication speed is lower. In this embodiment, the short-range radio communication unit 111 is used for communication with an external communication apparatus (a smartphone 120) that is capable of communication with WWAN. Note that the short-range radio communication unit 111 may be a short-range radio communication unit that carries out communication that complies with another standard.

A wireless LAN unit 112 (second communication unit) is capable of radio communication whose communication range is greater than the communication range of the short-range radio communication unit 111, and is constituted by an antenna, a modulation/demodulation circuit, and a communication controller, for example. The wireless LAN unit 112 of this embodiment is assumed to implement radio communication that complies with IEEE 802.11x (x is b, a, g, n, ac, etc.) standards, for example, according to control of the control unit 101. In this embodiment, the wireless LAN unit 112 is used for communication with a public network 150 via a wireless LAN access point 140 (hereinafter, simply referred to as AP 140) that is an external communication apparatus, and communication with an external communication apparatus (the smartphone 120). Here, the public network 150 is a public computer network that the wireless LAN unit 112 cannot access directly, and is the Internet, for example.

Note that communication between the digital camera 100 and the smartphone 120 may be wired communication in which a cable or the like is used. As will be described later, either wired or wireless communication may be used as long as the digital camera 100 can obtain, from the smartphone 120, radio regulation information that depends on the geographical location at which communication is carried out, or more specifically, radio regulation information that is applied to the radio communication at the current location. Therefore, the digital camera 100 may have a wired communication unit, instead of or in addition to the short-range radio communication unit 111.

Next, the smartphone 120 will be described. Note that, here, the smartphone 120 is an example of an external communication apparatus that is capable of both radio communication with WWAN such as a cellular network that is mutually connected to the public network 150 and short-range radio communication with the digital camera 100, and may be another apparatus such as a tablet terminal, for example.

For example, a control unit 121 has one or more programmable processors, controls the constituent elements of the smartphone 120 by loading a program stored in a non-volatile memory 123 to a memory 122 and performing the program, for example, and realizes the functions of the smartphone 120. Note that at least a portion of the operations of the control unit 121 may be processed by hardware such as an ASIC.

The memory 122 is used as a buffer memory for temporarily holding various types of data, and is used as a work area of the control unit 121.

For example, the non-volatile memory 123 is electrically erasable and recordable, and stores programs that are performed by the control unit 121, various setting values, GUI (Graphical User Interface) data and the like.

An operation unit 124 has input devices that can be operated by the user, such as buttons and switches. For example, the operation unit 124 may include a power button, a volume button, a home button, a screen switching button and the like, but is not limited thereto. In addition, the operation unit 124 may include a touch panel of a display unit 125 and soft keys realized by combination of GUI display and the touch panel.

The display unit 125 is used for display of an application screen, GUI display of a menu screen and the like. The display unit 125 may be a touch display. Note that it suffices for the smartphone 120 to have at least a display control function, and the display unit 125 may be an external apparatus.

A recording medium 126 is used for storing data of shot images and the like, and may be a non-volatile memory or a magnetic storage apparatus, for example. The recording medium 126 may or may not be detachable. The recording medium 126 may also be an external storage apparatus. It suffices for the smartphone 120 to be able to at least access the recording medium 126.

A short-range radio communication unit 131 (fourth communication unit) is constituted by an antenna, a modulation/demodulation circuit and a communication controller, for example. The short-range radio communication unit 131 of this embodiment is assumed to implement short-range radio communication that complies with the BLE standard, for example, according to control of the control unit 121. In this embodiment, the short-range radio communication unit 131 is used for communicating with an external communication apparatus (the digital camera 100) that does not have a function for communicating with WWAN. Note that the short-range radio communication unit 131 may be a short-range radio communication unit for carrying out communication that complies with another standard.

A wireless LAN unit 132 (fifth communication unit) is constituted by an antenna, a modulation/demodulation circuit and a communication controller, for example. The short-range radio communication unit 131 of this embodiment is assumed to implement radio communication that complies with IEEE 802.11x (x is b, a, g, n, ac, etc.) standards, for example, according to control of the control unit 121. In this embodiment, the wireless LAN unit 132 is used for communication with the public network 150 via the AP 140 and communication with the external communication apparatus (the digital camera 100).

A public radio communication unit 133 (third communication unit) is a communication unit for carrying out radio communication that is different from communication of the short-range radio communication unit 131 and the wireless LAN unit 132, such as communication with a mobile phone network. The public radio communication unit 133 is constituted by an antenna, a modulation/demodulation circuit and a communication controller, for example. In this embodiment, radio communication that complies with W-CDMA (UMTS), LTE (Long Term Evolution) and the like is realized. The control unit 101 controls the public radio communication unit 133, and realizes communication with the public network 150 via a base station 160.

A GPS (Global Positioning System) unit 134 receives data signals from a GPS satellite 170, and determines the current three-dimensional position (the latitude, longitude and altitude) of the smartphone 120. Note that the position of the smartphone 120 may be measured by an A-GPS system in which information obtained from the base station 160 is used, or may be measured by a method in which signals from a satellite are not used, for example, by using the position of a wireless LAN access point.

System Overview

Next, an overview of the communication system will be described with reference to FIGS. 2 and 3.

Figure 2:
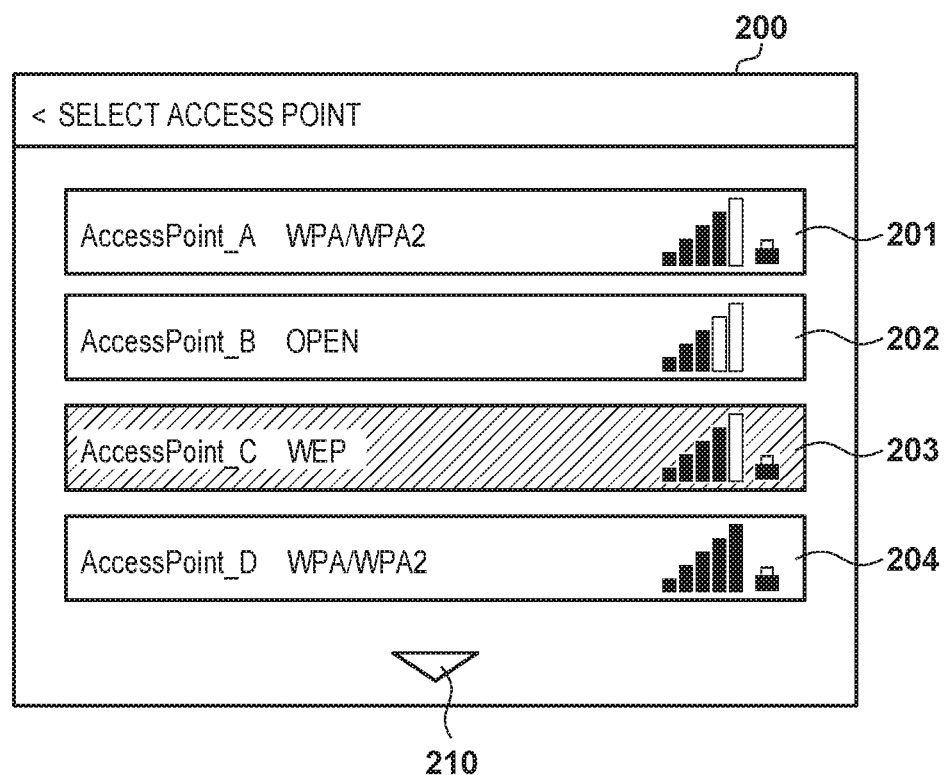
FIG. 2 is a diagram showing an example of an access point selection screen displayed on a digital camera according to the embodiments.

FIG. 2 shows an example of an access point selection screen 200 that is displayed on the display unit 105 by the digital camera 100, and that is a GUI screen for prompting the user to select one of the access points that exist on the periphery. For example, if it is determined in determination processing, which will be described later, that there is no access point connection history, the control unit 101 displays, on the display unit 105, the access point selection screen 200 shown in FIG. 2, but the access point selection screen 200 may be displayed according to another factor such as a user instruction.

The access point selection screen 200 includes icons 201 to 204 corresponding to the access points. On each of the icons 201 to 204, information regarding a corresponding access point is displayed. If there is an access point that cannot be selected at the current point in time, the control unit 101 displays the access point selection screen such that the user can visually distinguish the access point that cannot be selected, for example, by graying out the corresponding icon. The access point that cannot be selected is an access point that complies with the radio regulation of the current location and at which communication cannot be established, for example. In the example in FIG. 2, an access point C cannot be selected, and thus a corresponding icon 203 is grayed out.

If an operation of selecting an access point that cannot be selected (an operation of selecting the icon 203) is input through the operation unit 104, the control unit 101 disregards the input. If an operation of selecting an access point that can be selected (an operation of selecting one of the icons 201, 202 and 204) is input through the operation unit 104, the control unit 101 controls the wireless LAN unit 112 so as to establish connection with the selected access point. Note that if there are too many access points to display on one screen, the user can scroll the access point selection screen 200 by operating a scroll button 210.

Figure 3:
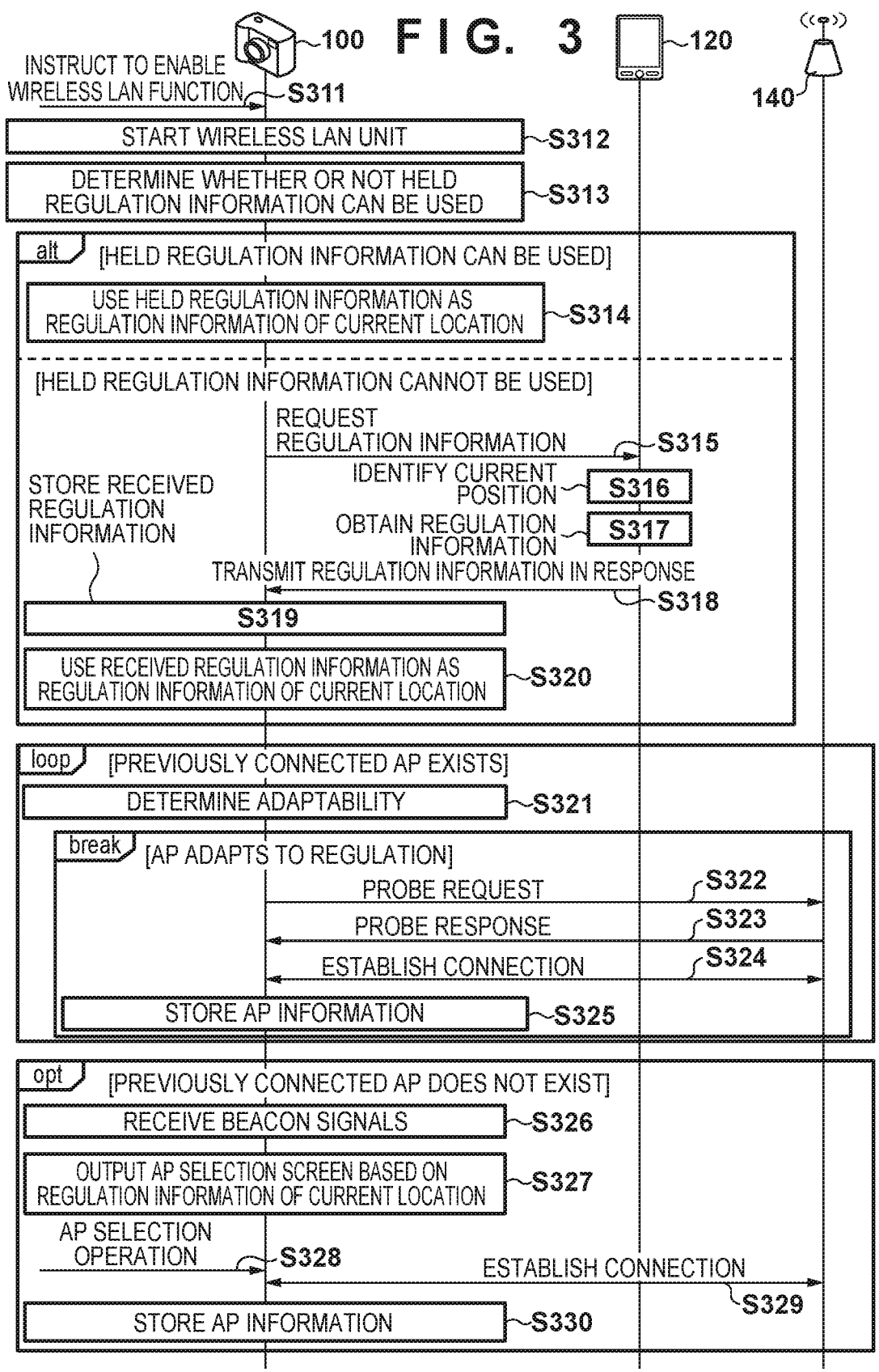
FIG. 3 is a sequence diagram showing an overview of a communication procedure in a first embodiment.

FIG. 3 is a sequence diagram related to operations of the digital camera 100 (the control unit 101), the smartphone 120 (the control unit 121) and the AP 140 in the communication system. In addition, it is assumed that an application for cooperating with the digital camera 100 has been performed in the smartphone 120, but an OS that operates on the smartphone 120 may provide a similar function. Description will be given assuming that pairing of the digital camera 100 and the smartphone 120 is complete and communication that complies with BLE is possible through the short-range radio communication units 111 and 131, at the time of starting the sequence in FIG. 3.

In step S311, upon receiving, through the operation unit 104, an instruction to enable the function for wireless LAN communication, the control unit 101 starts operating the wireless LAN unit 112 in step S312.

In step S313, the control unit 101 determines whether or not radio regulation information for wireless LAN stored in the non-volatile memory 103 (hereinafter, held regulation information) can be used. For example, the control unit 101 can determine whether or not the held regulation information can be used, based on a time that has elapsed since the held regulation information was stored in the non-volatile memory 103. For example, if the time that has lapsed since the held regulation information was stored in the non-volatile memory 103 is shorter than a predetermined time, the control unit 101 determines that the held regulation information can be used, and if the time that has lapsed is longer than or equal to the predetermined time, determines that the held regulation information cannot be used. Note that, also if no regulation information is stored in the non-volatile memory 103, the control unit 101 determines that the held regulation information cannot be used. Note that the regulation information for wireless LAN is stored in the non-volatile memory 103 at the time of performing step S320 to be described later.

If the control unit 101 determines in step S313 that the held regulation information can be used, the processing shown in step S314 is performed, and if the control unit 101 determines in step S313 that the held regulation information cannot be used, the processing shown in step S315 to step S320 is performed.

In step S314, the control unit 101 determines to use the held regulation information as regulation information of the current location that will be referred to in step S321 or S327 to be described later, and advances the procedure to step S321.

On the other hand, in step S315, the control unit 101 transmits a request for regulation information to the smartphone 120 (the control unit 121) through the short-range radio communication unit 111.

Upon receiving the request for radio regulation information (hereinafter, simply referred to as regulation information) through the short-range radio communication unit 131, the control unit 121 measures the current position in step S316. Specifically, the control unit 121 receives data signals from the GPS satellite 170 through a GPS unit 134, and identifies the current position of the smartphone 120. Note that the smartphone 120 and the digital camera 100 are in proximity to each other to a degree to which short-range radio communication is possible, and thus from the viewpoint of the radio regulation, the smartphone 120 and the digital camera 100 can be considered to be substantially at the same position.

Subsequently, in step S317, the control unit 121 obtains wireless LAN regulation information of the current position, from the public network 150 through the public radio communication unit 133 or the wireless LAN unit 132. The regulation information is information such as a channel band, a channel width and a radio wave intensity, and is stipulated according to the geographical location (for example, for each country) at which communication is carried out. For example, the control unit 121 can obtain, from the public network 150, regulation information that is applied to wireless LAN communication at the current position by adding information regarding the measured current position to a predetermined URL, and accessing the public network 150. For example, a configuration can be adopted in which the manufacturer of the digital camera 100 installs, on the public network 150, for example, a server as shown in FIG. 4 in which regulation information of all the countries in the world is stored, and a URL for obtaining regulation information from the server is registered in a camera cooperation application of the smartphone 120. In the regulation information illustrated in FIG. 4, available frequency bands (communication channels) and maximum transmission power are defined for each country (or region). A circle indicates a communication channel that can be used, and a dash indicates a communication channel that cannot be used. Maximum permitted transmission power is indicated in the transmission power field in the lowest portion. Note that FIG. 4 shows an example of regulation information, and types of items included in the regulation information and the data format of the regulation information are not limited to the form shown in FIG. 4.

In this case, the server identifies the country from position information (for example, the latitude and longitude) that is added to the URL, and provides regulation information corresponding to the country. If the regulation information recorded in the server is always maintained up-to-date, the smartphone 120 can obtain the latest regulation information of the current position. Note that the server that provides radio regulation information is not limited to a server that has been installed by the manufacturer of the digital camera 100, and may be any server as long as it is guaranteed that the information is the latest. In addition, a function for identifying a country from position information may be realized using another server on the public network 150.

In step S318, the control unit 121 transmits the wireless LAN regulation information of the current location to the digital camera 100 through the short-range radio communication unit 131 along with information regarding the date and time when the wireless LAN regulation information was obtained.

Note that, for example, if the smartphone 120 has already received regulation information of the current location (including regulation information regarding wireless LAN) from the base station 160, the control unit 121 may return the received regulation information in step S318 without performing steps S316 and S317. In addition, for example, if the smartphone 120 stores the latest wireless LAN regulation information of each country, wireless LAN regulation information of the current location may be read out in accordance with a result of measuring the position in step S316, and returned in step S318.

In step S319, the control unit 101 stores, in the non-volatile memory 103, the regulation information received from the smartphone 120 through the short-range radio communication unit 111, along with the date and time at which the regulation information was received. At this time, if the held regulation information is stored in the non-volatile memory 103, the control unit 101 overwrites the stored held regulation information with the received regulation information.

In step S320, the control unit 101 determines to use the regulation information (received regulation information) received from the smartphone 120, as regulation information of the current location that will be referred to in step S321 or S327 to be described later, and advances the procedure to step S321.

In step S321, the control unit 101 refers to access point information stored in the non-volatile memory 103, and determines whether or not each wireless LAN access point with which communication has been established previously (hereinafter, a previously connected access point) adapts to the radio regulation of the current location. The access point information is assumed to include at least an SSID (Service Set Identifier), security information, a password, a channel band, a channel width and a radio wave intensity of the access point, but is not limited thereto.

In step S321, the control unit 101 uses either the held regulation information (step S314) or the received regulation information (step S320), as regulation information indicating the radio regulation of the current location, according to the result of the determination in step S313 as to whether or not the held regulation information can be used. The control unit 101 determines a previously connected access point that satisfies all the items of the radio regulation of the current location (e.g., a channel band, a channel width and a radio wave intensity) to be an access point that adapts to the radio regulation of the current location. On the other hand, the control unit 101 determines a previously connected access point that does not satisfy all the items of the radio regulation of the current location to be an access point that does not adapt to the radio regulation of the current location.

In step S322, the control unit 101 searches for the access point that was determined in step S321 as adapting to the radio regulation of the current location. Specifically, the control unit 101 transmits, through the wireless LAN unit 112, a probe request for the access point that was determined as adapting to the radio regulation of the current location (performs active scanning). Note that information regarding a previously connected access point such as an access point name (SSID) included in the probe request can be obtained from the non-volatile memory 103. FIG. 3 illustrates processing in the case where it is determined that the AP 140 is an access point that adapts to the radio regulation of the current location.

Upon receiving the probe request, AP 140 transmits a probe response in step S323.

Upon receiving the probe response from AP 140 through the wireless LAN unit 112, the control unit 101 carries out authentication, association and the like with AP 140 in step S324, and establishes wireless connection with AP 140.

Note that if the control unit 101 does not receive a probe response when a certain time has elapsed after transmitting the probe request, the control unit 101 performs the processing of step S321 onward on another previously connected access point.

In step S325, the control unit 101 stores, in the non-volatile memory 103, information regarding the access point (here, AP 140) with which connection has been established. The information that is stored here includes at least an SSID (Service Set Identifier), security information, a password, a channel band, a channel width and a radio wave intensity of AP 140. Here, the access point regarding which information is stored is an access point that has been connected before, and thus the control unit 101 may overwrite past information stored in the non-volatile memory 103 with the information obtained from the access point so as to update the information.

As described above, active scanning is performed on access points determined as adapting to the radio regulation of the current location out of previously connected access points, and if wireless connection with one of the access points is established, the processing in FIG. 3 ends. After that, the control unit 101 can perform radio communication with the public network 150 and the smartphone 120 through the access point with which connection has been established.

On the other hand, if there is no previously connected access point that has been determined as adapting to the radio regulation of the current location, and if connection with any of previously connected access points determined as adapting to the radio regulation of the current location could not be established, the control unit 101 carries out the processing of step S326 onward.

In step S326, the control unit 101 receives, through the wireless LAN unit 112, beacon signals transmitted from wireless LAN access points on the periphery (performs passive scanning) for a predetermined period. This processing allows the control unit 101 to collect information regarding the wireless LAN access points that exist on the periphery of the digital camera 100.

After the predetermined period has elapsed, in step S327, the control unit 101 generates the access point selection screen 200 (FIG. 2) that is based on the received beacon signals, and outputs the access point selection screen 200 to the display unit 105. In generation of the access point selection screen 200, the control unit 101 detects an access point that does not adapt to the radio regulation of the current location, from information included in the beacon signals and the radio regulation of the current location (the held regulation information or the received regulation information). The control unit 101 can also detect an access point that requires specification that cannot be supported by the wireless LAN unit 112, based on the information included in the beacon signal.

The control unit 101 then generates the unselectable access point selection screen 200, for the access point that does not adapt to the radio regulation of the current location and the access point that requires specification that cannot be supported by the wireless LAN unit 112 (collectively referred to as unconnectable APs). As described above, a configuration can be adopted in which an icon corresponding to an unconnectable AP is grayed out, for example, so as to visually indicate that this icon cannot be selected, an operation of selecting an icon corresponding to an unconnectable AP is not accepted, and a selection operation is disregarded.

In step S328, upon receiving, through the operation unit 104, an operation of selecting an access point, the control unit 101 establishes connection with the selected access point (for example, AP 140) in step S329. The processing of step S329 may be similar to the processing of step S324.

In step S330, the control unit 101 newly stores, in the non-volatile memory 103, information regarding the access point with which connection has been established (here, AP 140). The information that is stored here at least includes an SSID (Service Set Identifier), security information, a password, a channel band, a channel width and a radio wave intensity of AP 140.

As described above, if connection with a previously connected access point could not be established, passive scanning is performed, and information regarding access points on the periphery is collected. The user is then prompted to select one access point that adapts to the radio regulation among the access points that exist on the periphery, and establishes wireless connection with the selected access point. When wireless connection is established, the processing in FIG. 3 is ended. After that, the control unit 101 can perform radio communication with the public network 150 and the smartphone 120 through the access point with which connection has been established.

Operations of Digital Camera

Figure 5A:
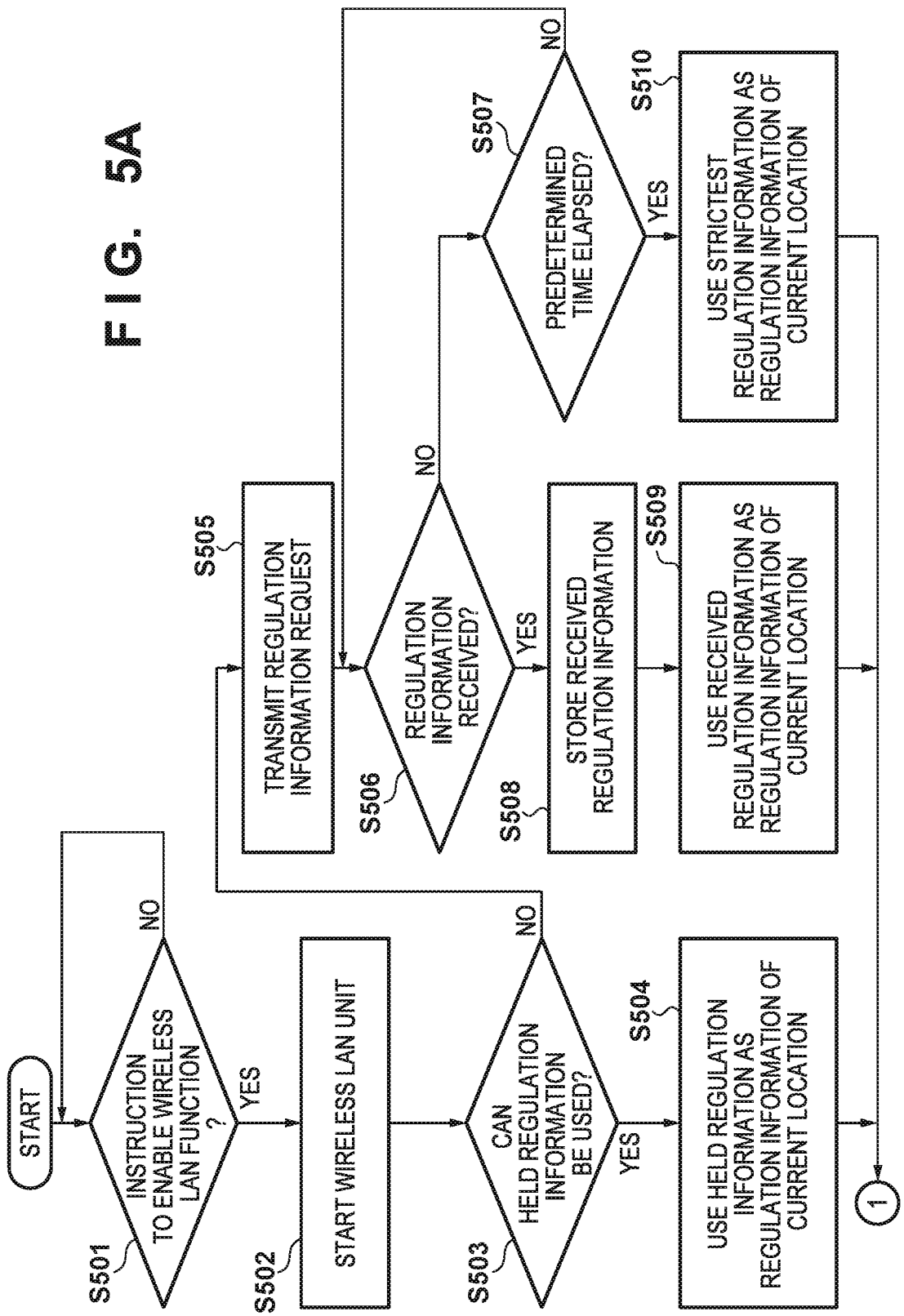

The operations of the digital camera in the sequence diagram in FIG. 3 will be described in more detail with reference to the flowcharts shown in FIGS. 5A and 5B.

In step S501, the control unit 101 determines whether or not an instruction to enable a wireless LAN communication function has been received through the operation unit 104, and if it is determined that such an instruction has been received, advances the procedure to step S502, and if it is not determined that such an instruction has been received, repeatedly performs the determination.

In step S502, the control unit 101 enables (starts) the wireless LAN unit 112 (this processing corresponds to step S314 in FIG. 3).

In step S503, the control unit 101 determines whether or not wireless LAN radio regulation information (hereinafter, held regulation information) stored in the non-volatile memory 103 can be used, and if it is determined that the wireless LAN radio regulation information can be used, advances the procedure to step S504, and if it is determined that the wireless LAN radio regulation information cannot be used, advances the procedure to step S505 (this processing corresponds to step S315 in FIG. 3).

In step S504, the control unit 101 determines to use the held regulation information as regulation information of the current location that will be referred to in step S513 or S519 to be described later, and advances the procedure to step S511 (this processing corresponds to step S316 in FIG. 3).

In step S505, the control unit 101 transmits a request for regulation information to the smartphone 120 (the control unit 121) through the short-range radio communication unit 111 (this processing corresponds to step S317 in FIG. 3).

In step S506, the control unit 101 determines whether or not regulation information has been received from the smartphone 120 through the short-range radio communication unit 111, and if it is determined that regulation information has been received, advances the procedure to step S508, and if it is not determined that regulation information has been received, advances the procedure to step S507.

In step S507, the control unit 101 determines whether or not a predetermined time has elapsed since the regulation information was transmitted in step S505, and if it is determined that the predetermined time has elapsed, advances the procedure to step S510, and if it is not determined that the predetermined time has elapsed, returns the procedure to step S506.

In step S508, the control unit 101 stores, in the non-volatile memory 103, the received regulation information along with information regarding the date and time when the regulation information was obtained, and advances the procedure to step S509.

In step S509, the control unit 101 determines to use the regulation information (the received regulation information) received from the smartphone 120 as regulation information of the current location that will be referred to in step S512 or S518 to be described later, and advances the procedure to step S511 (this processing corresponds to step S320 in FIG. 3).

In step S510, the control unit 101 determines to use the most stringent regulation information in the world (the strictest regulation information) as regulation information of the current location that will be referred to in step S512 or S518 to be described later, and advances the procedure to step S511. Here, the strictest regulation information may be information indicating a channel band, a channel width, a radio wave intensity and the like that can be used in common throughout the world, for example.

In step S511, the control unit 101 refers to the non-volatile memory 103, and determines whether or not there is information regarding a previously connected access point for which the determination in step S512 has not been carried out. If it is determined that there is such information, the control unit 101 advances the procedure to step S512, and if it is not determined that there is such information, advances the procedure to step S517.

In step S512, the control unit 101 determines whether or not the information regarding one previously connected access point stored in the non-volatile memory 103 adapts to the radio regulation of the current location (this processing corresponds to step S321 in FIG. 3). The control unit 101 uses the regulation information determined in one of steps S504, S509 and S510, as the radio regulation of the current location. If it is determined that the previously connected access point of interest adapts to the radio regulation of the current location, the control unit 101 advances the procedure to step S513, and if it is not determined that the previously connected access point of interest adapts to the radio regulation of the current location, returns the procedure to step S511, and performs processing on another previously connected access point.

In step S513, the control unit 101 transmits a probe request to the previously connected access point determined as adapting to the radio regulation of the current location, through the wireless LAN unit 112, and advances the procedure to step S514 (this processing corresponds to step S322 in FIG. 3).

In step S514, the control unit 101 determines whether or not a probe response to the probe request transmitted in step S513 has been received through the wireless LAN unit 112 before a certain time has elapsed after the transmission of the probe request. If it is determined that a probe response has been received, the control unit 101 advances the procedure to step S515, and if it is not determined that a probe response has been received, returns the procedure to step S511, and performs processing on another previously connected access point.

In step S515, the control unit 101 carries out association and the like with an access point that is the source of the transmission of the probe response to establish wireless connection, and advances the procedure to step S516 (this processing corresponds to step S324 in FIG. 3).

In step S516, the control unit 101 stores information regarding the access point with which connection has been established, in the non-volatile memory 103, and ends the procedure (this processing corresponds to step S325 in FIG. 3).

On the other hand, if there is not a previously connected access point determined as adapting to the radio regulation of the current location, and if connection could not be established with any of previously connected access points determined as adapting to the radio regulation of the current location, the control unit 101 carries out processing of step S517 onward.

In step S517, the control unit 101 receives, through the wireless LAN unit 112, beacon signals transmitted from wireless LAN access points on the periphery for a predetermined period, and advances the procedure to step S518 (this processing corresponds to step S326 in FIG. 3). This processing allows the control unit 101 to collect information regarding the wireless LAN access points that exist on the periphery of the digital camera 100.

In step S518, the control unit 101 generates the access point selection screen 200 (FIG. 2) that is based on the received beacon signals, and outputs the access point selection screen 200 to the display unit 105 (this processing corresponds to step S327 in FIG. 3). Here, the control unit 101 generates the unconnectable access point selection screen 200 for an unconnectable access point such as an access point that does not adapt to the radio regulation of the current location (as determined in one of steps S504, S509 and S510).

In step S519, the control unit 101 determines whether an operation of selecting an access point has been received through the operation unit 104 or an operation of cancelling selection has been received, and if it is determined that a selection operation has been received, advances the procedure to step S520, and if it is determined that an operation of cancelling selection has been received, ends the procedure.

In step S520, the control unit 101 establishes connection with the selected access point through the wireless LAN unit 112 (this processing corresponds to step S329 in FIG. 3).

In step S521, similarly to step S516, the control unit 101 stores (adds) information regarding the access point connected in step S520 in the non-volatile memory 103, and ends the processing (this processing corresponds to step S330 in FIG. 3).

As described above, a wireless communication device of this embodiment has a first radio communication unit and a second radio communication unit whose communication range is greater than that of the first radio communication unit. First, the wireless communication device obtains radio regulation information of the current location from an external wireless communication device using the first radio communication unit. The wireless communication device then makes a request for connection using the second radio communication unit to an access point that adapts to the radio regulation of the current location out of access points which have been accessed before or access points that exist on the periphery. Therefore, even if there is not a function for connecting to a wide area communication network such as a wireless wide area network or a public network, it becomes possible to carry out radio communication that adapts to the latest radio regulation information of the current location. In addition, in the case of carrying out radio communication with an access point that has been accessed before, user intervention is not required, and thus it is not necessary to prompt the user to input information regarding the current location.

Second Embodiment

Next, a second embodiment of the present invention will be described. In the first embodiment, a configuration was adopted in which, if connection could not be established with a previously connected access point, information regarding access points on the periphery is collected (first, active scanning is attempted, and passive scanning is then carried out). On the other hand, in this embodiment, first, information regarding access points on the periphery is collected (passive scanning is performed), and if the access points on the periphery include a previously connected access point, connection with the previously connected access point is established automatically.

Note that this embodiment is the same as the first embodiment except for the operations of establishing connection with a wireless LAN, and thus operations specific to this embodiment will be mainly described below.

Figure 6:
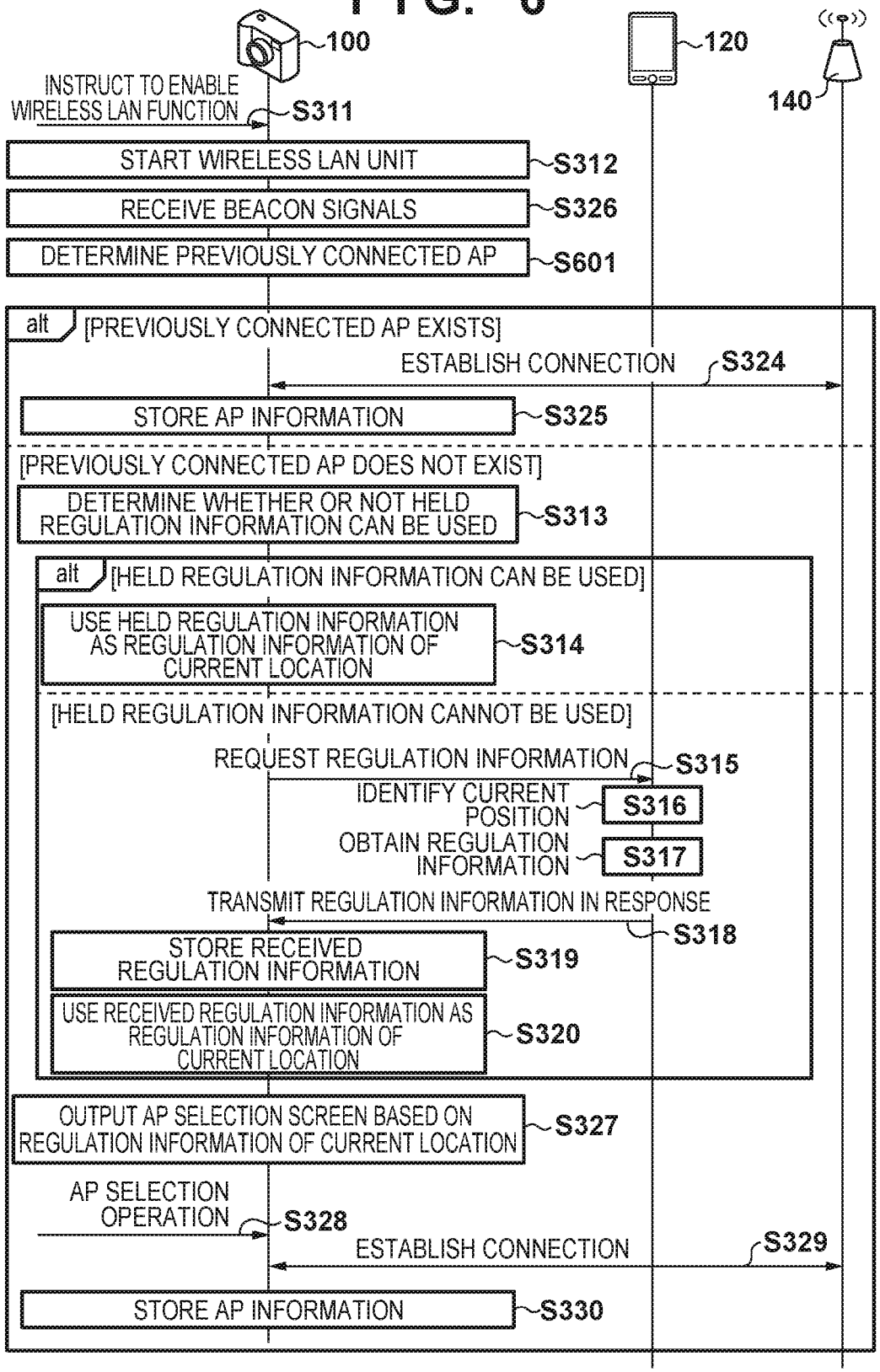
FIG. 6 is a sequence diagram showing an overview of a communication procedure of a second embodiment.

FIG. 6 is a sequence diagram related to operations of a digital camera 100 (a control unit 101), a smartphone 120 (a control unit 121) and AP 140 in a communication system of this embodiment. The same reference numerals as those in FIG. 3 are assigned to steps for carrying out processing similar to that of the first embodiment, and redundant description is omitted.

After enabling the wireless LAN unit 112 in step S312, the control unit 101 receives beacon signals from wireless LAN access points on the periphery (performs passive scanning) for a predetermined time in step S326. This processing allows the control unit 101 to collect information regarding the wireless LAN access points on the periphery of the digital camera 100.

After a predetermined time has elapsed, in step S601, the control unit 101 determines whether or not there is a previously connected access point among the access points from which the beacon signals were received in step S326, and if it is determined that there is a previously connected access point, performs steps S324 to S325, and if it is not determined that there is a previously connected access point, performs step S313 onward. For example, the control unit 101 can carry out the determination depending on whether or not information regarding a previously connected access point whose SSID matches one of the SSIDs included in the beacon signals is stored in the non-volatile memory 103.

All the processes performed after the determination processing of step S601 are processes described in the first embodiment, and thus description of each of the processes is omitted.

Operations of Digital Camera

Figure 7A:
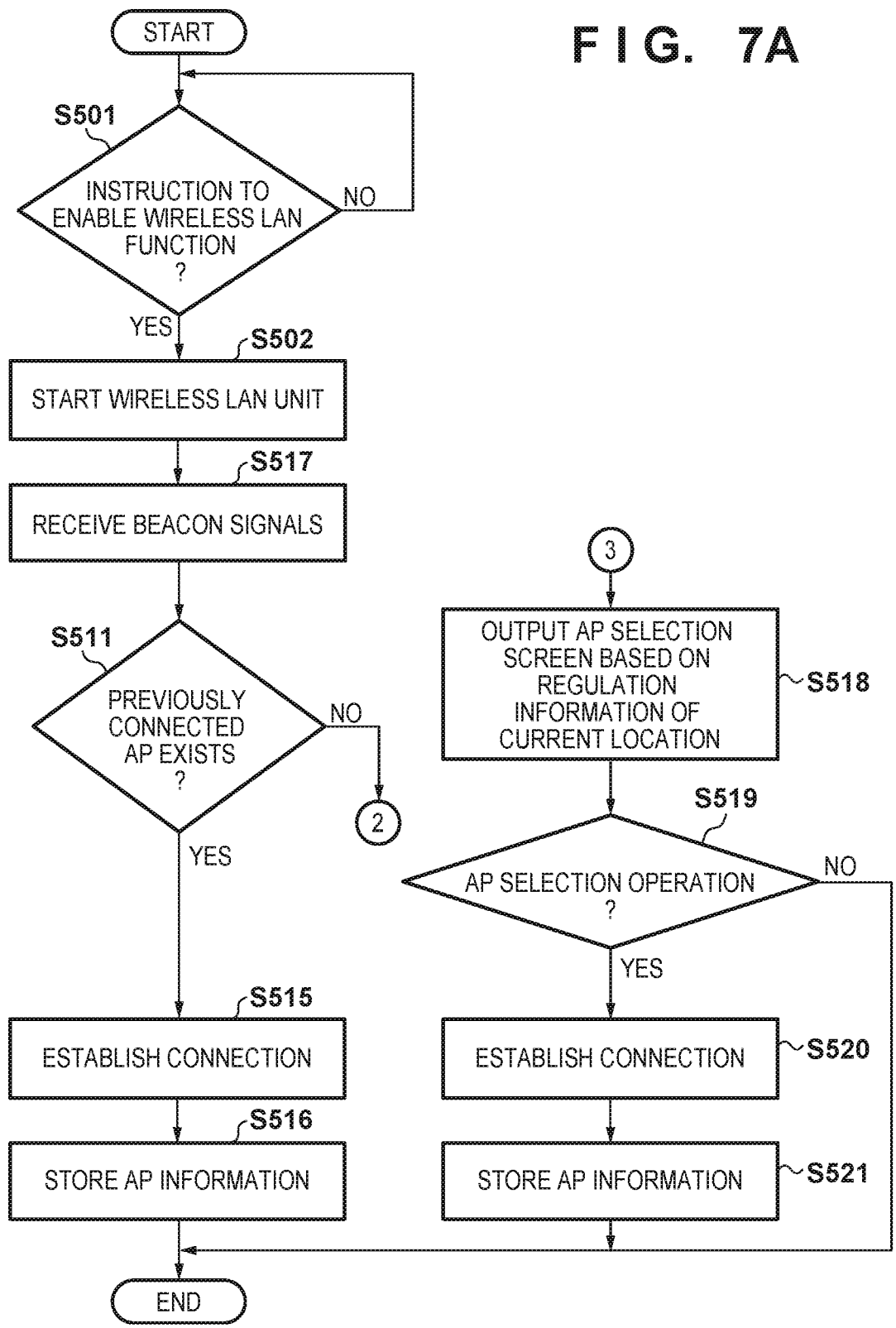
FIGS. 7A and 7B are flowcharts related to operations of a digital camera in the second embodiment.
Figure 7B:
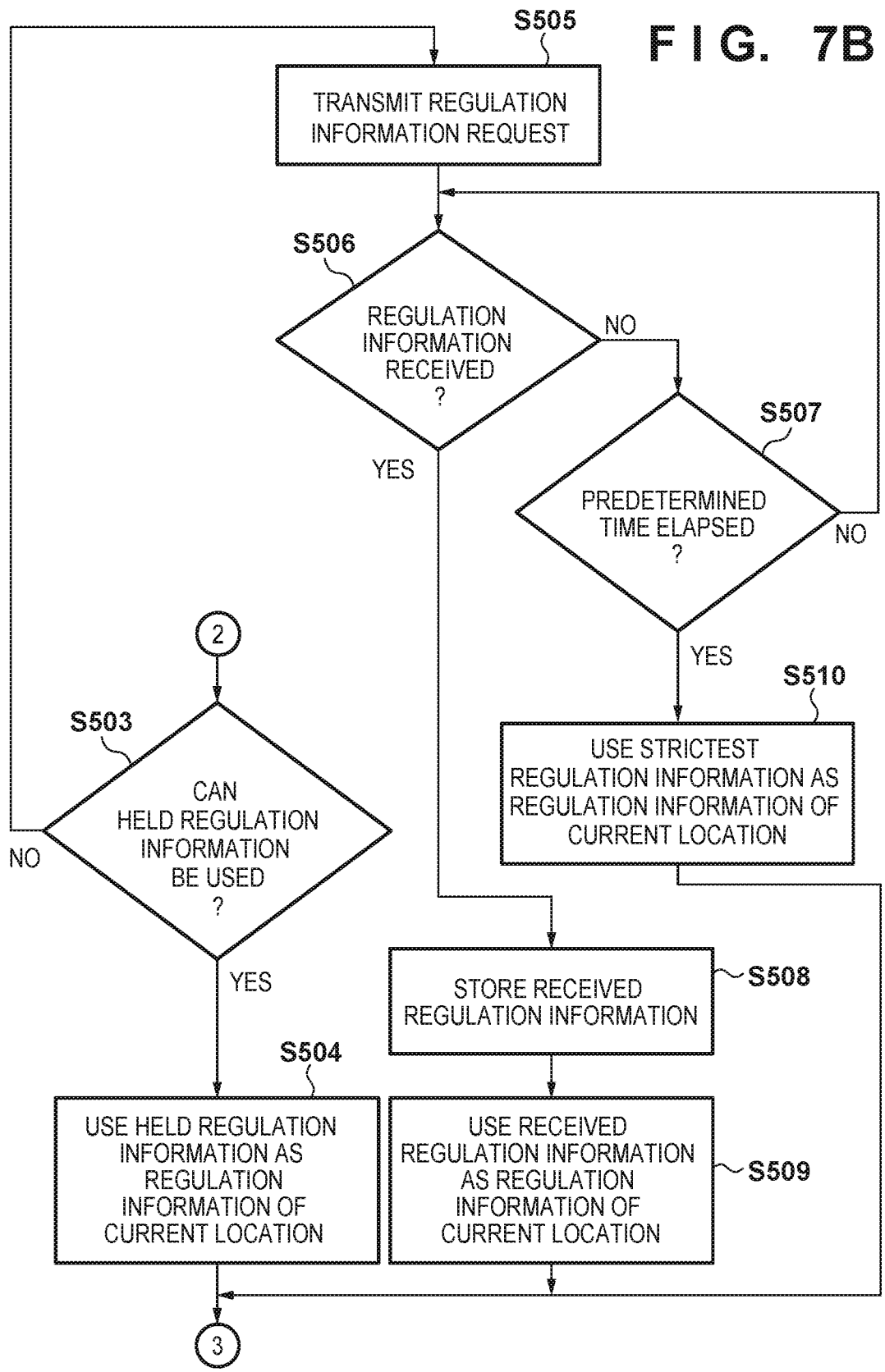

The operations of the digital camera in the sequence diagram in FIG. 6 will be described in more detail with reference to the flowcharts shown in FIGS. 7A and 7B. Also in FIGS. 7A and 7B, the same reference numerals as those in FIGS. 5A and 5B are assigned to steps for carrying out processing similar to the processing of the first embodiment, and redundant description is omitted.

As seen from comparison between FIGS. 5A and 5B, and FIGS. 7A and 7B, in this embodiment, after the wireless LAN unit 112 was enabled in step S502, beacon signal reception (passive scanning) in step S517 and determination processing in step S511 (this processing corresponds to step S601 in FIG. 6) are performed.

After that, in step S511, if it is determined that access points on the periphery at which a beacon signal has been received include a previously connected access point, the control unit 101 advances the procedure to step S515, and wireless connection with the previously connected access point is established immediately.

On the other hand, in step S511, if it is not determined that the access points on the periphery from which beacon signals have been received include a previously connected access point, the control unit 101 advances the procedure to step S503, and determines whether or not the held regulation information can be used. After that, the control unit 101 performs similar processing in a similar order to the first embodiment in steps S504 to S510, and determines information used as the radio regulation of the current location in one of steps S504, S509 and S510.

The control unit 101 then advances the procedure to step S518, and similarly to the first embodiment, generates and outputs the access point selection screen 200. Processing after that is also similar to that in the first embodiment, and thus description thereof is omitted.

As described above, in this embodiment, first, whether or not access points on the periphery include a previously connected access point is checked, and if it is determined that a previously connected access point is included, connection with the previously connected access point is established immediately. If it is not determined that access points on the periphery include a previously connected access point, connection is established with an access point that has been selected by the user from access points that have been determined to adapt to the radio regulation of the current location. Therefore, if the access points on the periphery include a previously connected access point, there is an effect that wireless LAN connection can be established in a short time, in addition to the effect of the first embodiment.

Third Embodiment

Next, a third embodiment of the present invention will be described. In this embodiment, radio communication between a digital camera 100 and a smartphone 120 through wireless LAN units 112 and 132 is automatically adapted to the radio regulation of the current location. Specifically, first, regulation information that is applied to wireless LAN communication at the current location is obtained using short-range radio communication through the short-range radio communication units 111 and 131, and wireless LAN communication that adapts to the radio regulation is then started. Hereinafter, a series of operations of obtaining information necessary for wireless LAN communication using short-range radio communication, and starting wireless LAN communication is referred to as handover connection. The handover connection processing that can be performed between the digital camera 100 and the smartphone 120 in a communication system shown in FIG. 1 will be described below.

Handover Connection Operations (Digital Camera)

First, operations of the digital camera 100 will be described with reference to FIG. 8. Note that communication using the short-range radio communication units 111 and 131 is assumed to be established at the point in time of starting the operations shown in FIG. 8. If communication using the short-range radio communication units 111 and 131 has not been established, it is sufficient that communication is carried out using an advertisement packet PDU in a state where the digital camera 100 operates as an advertiser and the smartphone 120 operates as a scanner.

In step S801, the control unit 101 determines whether or not a handover connection request has been received from the smartphone 120 through the short-range radio communication unit 111, and if it is determined that a handover connection request has been received, advances the procedure to step S802, and if it is not determined that a handover connection request has been received, advances the procedure to step S803.

In step S802, the control unit 101 transmits a success response indicating that the handover connection request has been approved, to the smartphone 120 through the short-range radio communication unit 111, and advances the procedure to step S805.

In step S803, the control unit 101 determines whether or not an instruction to start handover connection processing has been input through the operation unit 104, and if it is determined that an instruction to start handover connection processing has been input, advances the procedure to step S804, if it is not determined that an instruction to start handover connection processing has been input, returns the procedure to step S801.

In step S804, the control unit 101 transmits, to the smartphone 120 through the short-range radio communication unit 111, a request to transmit the handover connection request to the digital camera 100, and returns the procedure to step S801.

In step S805, the control unit 101 determines whether or not regulation information has been received in step S801 from the smartphone 120 along with the handover connection request, and if it is determined that regulation information has been received, advances the procedure to step S806, if it is not determined that regulation information has been received, advances the procedure to step S807. The regulation information is information including a frequency band (communication channel) at which radio waves can be output at the current position of the smartphone 120 and maximum transmission power. Note that as in the first and the second embodiments, regulation information may include information regarding the date and time when the regulation information was obtained.

In step S806, the control unit 101 determines a frequency band and transmission power that adapt to the regulation information received in step S801. The control unit 101 then enables (starts) the wireless LAN unit 112, controls the wireless LAN unit 112 so as to generate a wireless network at the determined frequency band and transmission power, and advances the procedure to step S808.

Note that if there are a plurality of frequency bands that can be selected, the control unit 101 can select a frequency band based on predetermined priority order. For example, assuming that a 2.4 GHz band and a 5 GHz band can be selected, the 5 GHz band in which radio wave interference is relatively small can be selected preferentially. Alternatively, a configuration may be adopted in which a frequency band at which a plurality of adjacent channels can be used is selected preferentially in order to realize high speed communication in which a channel extension function is used.

In step S807, the control unit 101 determines a frequency band and transmission power that adapt to the strictest regulation information. The control unit 101 then enables (starts) the wireless LAN unit 112, controls the wireless LAN unit 112 so as to generate a wireless network at the determined frequency band and transmission power, and advances the procedure to step S808. As described above, the strictest regulation information is the most stringent regulation information in the world, for example, and may be information indicating a channel band, a channel width (or a channel number), a radio wave intensity and the like that can be used in common throughout the world.

In step S808, the control unit 101 transmits information (connection information) for connecting the smartphone 120 (the wireless LAN unit 132) to the wireless network generated by the wireless LAN unit 112, to the smartphone 120 through the short-range radio communication unit 111. For example, the connection information may be an SSID (Service Set Identifier), an encryption system, an encryption key or the like of the wireless network. After transmitting the connection information, the control unit 101 advances the procedure to step S809.

In step S809, upon receiving a wireless LAN connection request from the smartphone 120 through the wireless LAN unit 112, the control unit 101 performs encryption authentication and the like, and establishes wireless LAN communication connection with the smartphone 120. This enables data communication between the digital camera 100 and the smartphone 120 using wireless LAN, and the control unit 101 ends the handover connection processing.

Handover Connection Operations (Smartphone)

Next, operations of the smartphone 120 corresponding to the operations of the digital camera 100 described with reference to FIG. 8 will be described with reference to FIG. 9.

In step S901, the control unit 121 determines whether or not a request to transmit the handover connection request transmitted by the digital camera 100 in step S804 has been received through the short-range radio communication unit 131, and if it is determined that the request has been received, advances the procedure to step S902, and if it is not determined that the request has been received, advances the procedure to step S903.

In step S903, the control unit 121 determines whether or not an instruction to start handover connection processing has been input through the operation unit 124, and if it is determined that such an instruction has been input, advances the procedure to step S902, and if it is not determined that such an instruction has been input, returns the procedure to step S901.

In step S902, the control unit 121 transmits the handover connection request to the digital camera 100 through the short-range radio communication unit 131, and advances the procedure to step S904. At this time, the control unit 121 transmits regulation information of the current location in addition to the handover connection request. The regulation information is information regarding a frequency band (communication channel) and maximum transmission power at which radio wave output is possible at the current location of the smartphone 120. The regulation information that is transmitted here may be information that has already been obtained through a public network 150 or a base station 160, or may be information obtained through the public network 150 or the base station 160 on receiving the request to transmit the handover connection request.

In step S904, the control unit 121 determines whether or not a success response indicating that the handover connection request (transmitted in step S802) was approved has been received from the digital camera 100 through the short-range radio communication unit 131 within a predetermined time. If it is determined that a success response has been received, the control unit 121 advances the procedure to step S905, and if it is not determined that a success response has been received, advances the procedure to step S907.

In step S907, for example, the control unit 121 notifies a user of a handover processing error by displaying an error message on a display unit 105, and ends the handover connection processing.

In step S905, the control unit 121 receives the wireless network connection information transmitted by the digital camera 100 in step S808, from the digital camera 100 through the short-range radio communication unit 131, and advances the procedure to step S906. The connection information may be information regarding an SSID and encryption.

In step S906, the control unit 121 uses the received connection information to transmit a request to connect to that wireless network through the wireless LAN unit 132, to the digital camera 100. After that, encryption authentication and the like are carried out between the wireless LAN units 112 and 132, and wireless LAN communication connection with the digital camera 100 is established. This enables data communication between the digital camera 100 and the smartphone 120 using the wireless LAN, and the control unit 121 ends the handover connection processing.

As described above, the handover connection processing in this embodiment can be started by either the digital camera 100 or the smartphone 120, and in both cases, wireless LAN communication that adapts to the regulation can be established. An operation sequence in the case where handover connection processing is started by the smartphone 120, and an operation sequence in the case where handover connection processing is started by the digital camera 100 will be described below with reference to sequence diagrams shown in FIGS. 10A and 10B.

Sequence Example of Handover Connection Processing Started by Smartphone

First, an example of an operation sequence of handover connection processing started by the smartphone 120 will be described with reference to FIG. 10A.

In step S1001, an instruction to start handover connection processing is input through the operation unit 124 (this processing corresponds to YES of step S903 in FIG. 9).

In response to this, in step S1002, the smartphone 120 (the control unit 121) transmits a handover connection request to the digital camera 100 through the short-range radio communication unit 131 (this processing corresponds to step S902 in FIG. 9). At this time, the control unit 121 transmits the handover connection request so as to include the regulation information of the current location.

In step S1003, the digital camera 100 (the control unit 101) transmits a success response to the smartphone 120 through the short-range radio communication unit 111 upon receiving the handover connection request (this processing corresponds to step S802 in FIG. 8).

In step S1004, the control unit 101 controls the wireless LAN unit 112 so as to generate a wireless network that adapts to the regulation information included in the received handover connection request (this processing corresponds to step S506 in FIG. 8).

In step S1005, the control unit 101 transmits information (connection information) for connecting to the wireless network generated by the wireless LAN unit 112, to the smartphone 120 through the short-range radio communication unit 111 (this processing corresponds to step S508 in FIG. 8).

In step S1006, the control unit 121 transmits a request for wireless LAN connection in which the received connection information is used to the digital camera 100 through the wireless LAN unit 132 (this processing corresponds to step S605 in FIG. 9).

In step S1007, the wireless LAN units 112 and 132 performs authentication and the like, and wireless LAN communication connection is established (this processing corresponds to step S809 in FIG. 8 and step S906 in FIG. 9).

Sequence Example of Handover Connection Processing Started by Digital Camera

Next, an example of an operation sequence of handover connection processing that is started by the digital camera 100 will be described with reference to FIG. 10B. Note that in FIG. 10B, the same reference numerals are assigned to processing steps whose contents are the same as those in FIG. 10A, and description thereof is omitted.

In step S1010, an instruction to start handover connection processing is input through the operation unit 104 (this processing corresponds to YES in step S803 in FIG. 8).

In response to this, in step S1011, the digital camera 100 (the control unit 101) transmits a request to transmit a handover connection request, to the smartphone 120 through the short-range radio communication unit 111 (this processing corresponds to step S804 in FIG. 8).

The subsequent operations are similar to step S1002 onward in FIG. 10A, and thus description thereof is omitted.

As described above, the wireless communication device of this embodiment generates a wireless network of a second radio communication unit, based on radio regulation information of the current location obtained from an external wireless communication device by a first radio communication unit. Therefore, even if there is not a function for connecting to a wide area communication network such as a wireless wide area network or a public network, it becomes possible to carry out radio communication that adapts to the latest radio regulation information of the current location.

Other Embodiments

In the first and second embodiments, a configuration is adopted in which a smartphone transmits regulation information in response to a request from a digital camera, but a configuration may be adopted in which the smartphone transmits regulation information to the digital camera at a predetermined timing. For example, a configuration may be adopted in which regulation information is received at the timing at which it is detected that the smartphone has moved to another country, and the digital camera is notified if the received regulation information is different from the regulation information that has been used up until that time. A configuration may also be adopted in which the digital camera is started by the notification, and stores the received regulation information.

In the above embodiments, a configuration is adopted in which the smartphone obtains current position information, but a configuration may be adopted in which the digital camera obtains current position information. For example, a configuration may be adopted in which the smartphone transmits regulation information of all the countries to the digital camera, and the digital camera obtains regulation information of the current location based on current position information.

In the first and second embodiments, if there is a previously connected access point, a lapsed time that is referred to in the determination as to whether or not held regulation information can be used may be set longer than in the case where there is no previously connected access point.

In the third embodiment, a configuration is adopted in which a digital camera 100 receives regulation information along with a handover connection request message, but a configuration may be adopted in which regulation information is received at another timing (for example, before a handover connection request message is received).

Also, in the above embodiments, a configuration may be adopted in which the date and time at which the digital camera 100 obtained regulation information from the smartphone 120 is compared with the date and time of an internal clock of the digital camera 100, and if the date and time at which the digital camera 100 obtained the regulation information is older than or equal to a threshold value, a request to reobtain (update) regulation information is made to the smartphone 120. In addition, if the date and time at which the digital camera 100 obtained the regulation information is older than or equal to the threshold value, the digital camera 100 may use the strictest regulation information as the regulation information of the current location. Note that if the digital camera 100 has a GPS receiver, time information obtained from the GPS may be used instead of time information of the internal clock.

Furthermore, in the above embodiments, a configuration has been described in which the first radio communication unit carries out short-range radio communication. However, a configuration may be adopted in which the first radio communication unit carries out NFC (Near Field Communication) and near-field radio communication such as TransferJet.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-125914, filed on Jun. 24, 2016, which is hereby incorporated by reference herein in its entirety.

What is claimed is:

1. A wireless communication device comprising:
a first communication circuit;
a second communication circuit that carries out radio communication;
at least one processor that, when executing a program stored in a memory, functions as:
a control unit configured to control operations of the first communication circuit and the second communication circuit,
wherein the control unit:
obtains regulation information that depends on a geographical location at which communication using the second communication circuit is carried out, from an external apparatus using the first communication circuit, and controls the second communication circuit so as to adapt to the regulation information and performs communication that uses the second communication circuit by:

requesting the external apparatus to transmit a request for communication that uses the second communication circuit, using the first communication circuit, generating a wireless network of the second communication circuit, in response to the request received through the first communication circuit, and transmitting information for connecting to the wireless network to the external apparatus using the second communication circuit.

2. The wireless communication device according to claim 1 further comprising:

a storage device that stores the regulation information obtained from the external apparatus, wherein the control unit determines whether the regulation information stored in the storage device is usable or not, wherein, in a case where the control unit determines that the regulation information stored in the storage device is unusable, the control unit obtains new regulation information from the external apparatus using the first communication circuit.

3. The wireless communication device according to claim 2, wherein in a case where a time that has elapsed after the regulation information stored in the storage device was stored is longer than or equal to a predetermined time, the control unit determines that the regulation information stored in the storage device is unusable.

4. The wireless communication device according to claim 2, wherein in a case where information regarding external communication apparatuses with which the second communication circuit has established communication in the past is stored in the wireless communication device, the control unit controls the second communication circuit so as to search for an external communication apparatus that adapts to the regulation information stored in the storage device or the new regulation information.

5. The wireless communication device according to claim 4, wherein in a case where an external communication apparatus that adapts to the regulation information stored in the storage device or the new regulation information is found as a result of the search, the control unit controls the second communication circuit so as to establish a radio communication connection with the found external communication apparatus.

6. The wireless communication device according to claim 4, wherein in a case where an external communication apparatus that adapts to the regulation information stored in the storage device or the new regulation information is not found as a result of the search, the control unit controls the second communication circuit so as to obtain information regarding external communication apparatuses that exist on a periphery.

7. The wireless communication device according to claim 6, wherein the control unit causes a display apparatus to display a screen for prompting a user to select one of the external communication apparatuses that exist on the periphery, based on the information regarding the external communication apparatuses that exist on the periphery.

8. The wireless communication device according to claim 7, wherein the control unit sets an external communication apparatus with which communication that complies with the regulation information stored in the storage device or the new regulation information cannot be established out of the external communication apparatuses that exist on the periphery to be unselectable on the screen.

9. The wireless communication device according to claim 6, wherein if the control unit determines, based on the obtained information, that an external communication apparatus with which communication was established in the past is included in the external communication apparatuses that exist on the periphery, the control unit controls the second communication circuit so as to establish communication with the external communication apparatus with which communication was established in the past.

10. The wireless communication device according to claim 9, wherein, in a case where an external communication apparatus with which communication was established in the past is not included in the external communication apparatuses that exist on the periphery, the control unit causes a display apparatus to display a screen for prompting a user to select one of the external communication apparatuses that exist on the periphery, based on the information regarding the external communication apparatuses that exist on the periphery.

11. The wireless communication device according to claim 1, wherein in a case where information regarding an external communication apparatus with which the second communication circuit has established communication in the past is not stored in the wireless communication device, the control unit controls the second communication circuit so as to obtain information regarding external communication apparatuses that exist on a periphery.

12. The wireless communication device according to claim 1, wherein the first communication circuit carries out radio communication, and the second communication circuit carries out radio communication whose communication range is greater than the radio communication of the first communication circuit.

13. The wireless communication device according to claim 1, wherein the first communication circuit carries out radio communication, the second communication circuit carries out radio communication whose communication range is greater than the radio communication of the first communication circuit, and communication that uses the second communication circuit is generation of a wireless network of the second communication circuit.

14. The wireless communication device according to claim 1, wherein the first communication circuit carries out radio communication that complies with short-range radio communication or near-field radio communication, and the second communication circuit carries out radio communication that complies with a wireless LAN.

15. The wireless communication device according to claim 1,
wherein the regulation information obtained from the external apparatus is regulation information that is applied to communication that is carried out at a current position of the external apparatus and uses the second communication circuit.

16. A wireless communication device comprising:
a first communication circuit that carries out radio communication with a wireless wide area network;
a second communication circuit that carries out radio communication with an external apparatus;
a third communication circuit that carries out, with the external apparatus, radio communication whose communication range is greater than the radio communication of the second communication circuit; and
at least one processor that, when executing a program stored in a memory, functions as:
a control unit configured to control operations of the first communication circuit, the second communication circuit, and the third communication circuit,
wherein the control unit:
obtains, using the first communication circuit, regulation information that is applied to communication that uses the third communication circuit at a current location, and
transmits the regulation information to the external apparatus through the second communication circuit,
wherein the control unit:
receives, from the external apparatus, a first request requesting to transmit a second request requesting for handover to communication that uses the third communication circuit, through the second communication circuit,
in response to the first request, transmits, to the external apparatus, the second request through the second communication circuit, and
receives, from the external apparatus, information for connecting to a wireless network through the third communication circuit, wherein the wireless network is generated by the external apparatus and the wireless communication device requires the third communication circuit for communication on the wireless network.

17. The wireless communication device according to claim 16,
wherein in response to the first request received through the second communication circuit, the control unit transmits the second request together with the regulation information, to the external apparatus.

18. A control method of a wireless communication device that has a first communication circuit and a second communication circuit, both configured to carry out radio communication, the control method comprising:
obtaining regulation information that depends on a geographical location at which communication using the second communication circuit is carried out, from an external apparatus using the first communication circuit unit; and
controlling the second communication circuit so as to adapt to the regulation information and performing communication that uses the second communication circuit, wherein the controlling comprises:
requesting the external apparatus to transmit a request for communication that uses the second communication circuit, using the first communication circuit,
generating a wireless network of the second communication circuit, in response to the request received through the first communication circuit, and
transmitting information for connecting to the wireless network to the external apparatus using the second communication circuit.

19. A control method of a wireless communication device that has a first communication circuit configured to carry out radio communication with a wireless wide area network, a second communication circuit configured to carry out radio communication with an external apparatus, and a third communication circuit configured to carry out, with the external apparatus, radio communication whose communication range is greater than the radio communication of the second communication circuit, the control method comprising:
obtaining, using the first communication circuit, regulation information that is applied to communication that uses the third communication circuit at a current location;
transmitting the regulation information to the external apparatus through the second communication circuit;
receiving, from the external apparatus, a first request requesting to transmit a second request requesting for handover to communication that uses the third communication circuit, through the second communication circuit;
in response to the first request, transmitting, to the external apparatus, the second request through the second communication circuit; and
receiving, from the external apparatus, information for connecting to a wireless network through the third communication circuit, wherein the wireless network is generated by the external apparatus and the wireless communication device requires the third communication circuit for communication on the wireless network.

20. A non-transitory computer-readable storage medium that stores a program executable by a computer of a wireless communication device comprising a first communication circuit and a second communication circuit configured to carry out radio communication, the program, when executed by the computer, causes the computer to function as:
a control unit configured to control operations of the first communication circuit and the second communication circuit,
wherein the control unit:
obtains regulation information that depends on a geographical location at which communication using the second communication circuit is carried out, from an external apparatus using the first communication circuit, and
controls the second communication circuit so as to adapt to the regulation information and performs communication that uses the second communication circuit by:
requesting the external apparatus to transmit a request for communication that uses the second communication circuit, using the first communication circuit,
generating a wireless network of the second communication circuit, in response to the request received through the first communication circuit, and
transmitting information for connecting to the wireless network to the external apparatus using the second communication circuit.

21. A non-transitory computer-readable storage medium that stores a program executable by a computer of a wireless communication device comprising a first communication circuit that carries out radio communication with a wireless wide area network; a second communication circuit that carries out radio communication with an external apparatus; and a third communication circuit that carries out, with the external apparatus, radio communication whose communication range is greater than the radio communication of the second communication circuit, the program, when executed by the computer, causes the computer to function as:

a control unit configured to control operations of the first communication circuit, the second communication circuit, and the third communication circuit, wherein the control unit:

obtains, using the first communication circuit, regulation information that is applied to communication that uses the third communication circuit at a current location, and transmits the regulation information to the external apparatus through the second communication circuit, wherein the control unit:

receives, from the external apparatus, a first request requesting to transmit a second request requesting for handover to communication that uses the third communication circuit, through the second communication circuit, in response to the first request, transmits, to the external apparatus, the second request through the second communication circuit, and receives, from the external apparatus, information for connecting to a wireless network through the third communication circuit, wherein the wireless network is generated by the external apparatus and the wireless communication device requires the third communication circuit for communication on the wireless network.

* * * * *